United States Patent [19]

Mendrala

[11] 3,989,889

[45] Nov. 2, 1976

[54] DIGITAL DISSOLVER

[75] Inventor: James A. Mendrala, San Fernando, Calif.

[73] Assignee: Sonex International Corporation, Burbank, Calif.

[22] Filed: Apr. 2, 1975

[21] Appl. No.: 564,319

[52] U.S. Cl. .............................. 178/7.2; 178/DIG. 6
[51] Int. Cl.² ........................................... H04N 5/38
[58] Field of Search ................ 358/22; 178/DIG. 6, 178/6, 6.8, 7.1, 7.2

[56] References Cited
UNITED STATES PATENTS

| | | | |
|---|---|---|---|
| 3,598,908 | 8/1971 | Poulett | 178/DIG. 6 |
| 3,732,365 | 5/1973 | Rando et al. | 178/DIG. 6 X |
| 3,758,712 | 9/1973 | Hudson | 178/DIG. 6 X |

Primary Examiner—Robert L. Griffin
Assistant Examiner—Aristotelis M. Psitos
Attorney, Agent, or Firm—Romney Schaap Golant Scillieri & Ashen

[57] ABSTRACT

A digital dissolver dissolves between two different video signals in synchronism with a composite sync signal. Frame pulses are separated from the composite sync signal and are used to generate a high frequency signal in phase locked relation with the frame pulses. The high frequency signal is fed to a programmable frequency divider under the control of gating and control circuitry to provide an output pulse in response to each occurrence of a selected number of cycles of the high frequency signal, the selected number being a function of the selected dissolve rate programmed into the divider by thumbwheel switches or by signals from a remote location. The pulses are fed to a binary counter which feeds a digital to analog converter to generate a dissolve signal of generally ramp-like waveform. The dissolve signal and its complement are applied to a pair of multipliers to attenuate the two different video signals.

29 Claims, 16 Drawing Figures

Fig. 4

DIGITAL DISSOLVER

BACKGROUND OF THE INVENTION

1. Field of the Invention

The present invention relates to apparatus for dissolving between two different video signals.

2. History of the Prior Art

The ability to dissolve between two different video signals has become a very useful tool, particularly in providing special effects. For example, there are numerous situations in which a transition from one video signal to another video signal over a selected period of time is desired. A gradual transition in many such situations can have a much more desirable and pleasing effect than a substantially instantaneous transition. It is also desirable in certain situations to provide a partial dissolve in which portions of both video signals are present. This is particularly important in the special effects area where portions of two separate and independently derived images are superimposed to create a single image.

A number of different techniques are known for dissolving between different video signals. In one such technique the two different video signals are applied to the inputs of a video mix amplifier provided with a pair of handles for selectively attenuating the two different video signals. As the handles are manually manipulated a dissolve between the two different video signals is effected. This approach to dissolving is a relatively crude one at best. The rate of dissolve is dependent on the speed at which the handles are manually manipulated. Thus it is extremely difficult to dissolve at a constant, given rate, particularly where the rate is a relatively rapid one. It is virtually physically impossible to dissolve at the high rates demanded by some situations such as less than 1/10 of a second. Furthermore the difficulty or impossibility of dissolving over a selected number of frames as well as the inability to synchronize the dissolve with the frame intervals makes editing extremely difficult or impossible.

Other dissolver arrangements utilize time constant circuits or similar arrangements for providing a dissolve over a selected time interval. While some such arrangement go so far as to separate and utilize vertical information in their attempt to provide synchronism with the composite sync signal, such arrangement are incapable of insuring that the dissolve begins at the beginning of a particular frame and ends at the end of a particular frame. Such arrangement also suffer from other problems including a visually discernible coarseness during the dissolve and the inability to select the dissolve rate remotely.

Accordingly, it would be desirable to provide a digital dissolver which is closely synchronized with the composite sync signal.

It is a further object of the invention to provide a dissolver which separates frame pulses from the composite sync signal to that dissolve may be begun at the beginning of a given frame and terminated at the end of a given frame.

It is a further object of the invention to provide a dissolver in which the dissolve rate can be selected both locally and remotely and in terms of a specified number of frames.

It is a still further object of the invention to provide a dissolver capable of performing a variety of different functions in addition to dissolve between the two different video signals including the ability to stop at a predetermined point part way through the dissolve, the ability to reverse the dissolve after stopping part way through the dissolve and the ability to cut substantially instantaneously to the video source being dissolved to.

Brief Description of the Invention

Digital dissolvers in accordance with the invention separate the frame pulses from the composite sync signal so as to synchronize the dissolve operation with the individual frames. Such dissolvers are digital in their nature to provide for an advantageous and reliable operation and in which various parameters such as the rate of dissolve may be represented in digital or binary fashion. The rate of dissolve may be remotely as well as locally selected, and a variety of different modes of operation are possible.

Digital dissolvers in accordance with the invention separate the frame pulses from the composite sync signal by separating the vertical and horizontal information from the composite sync signal and comparing the separated vertical and horizontal information to identify the individual frame pulses. The separated frame pulses defining a frame signal are used to generate a frame related signal which is in phase locked relation with the frame signal and which has a frequency which is a multiple of the frequency of the frame signal. The frame related signal is applied via a gate to a programmable divider during a dissolve. The programmable divider includes decade counters which count the individual cycles of the frame related signal and compare the count with a digital value representing the number of frames over which the dissolve is to occur. The digital dissolve rate value is provided locally such as by use of thumbwheel switches or can be provided remotely by means for transmitting digital signals. Each time that the comparison determines the number of cycles occurring in the frame related signal to equal the digital dissolve rate value, a pulse is provided to a counter programmable to count in opposite directions between two different count values. A digital to analog converter converts the changing count within the counter into an analog signal of stepped, generally ramp-like waveform. The waveform and its complement as provided by an inverter are adjusted as necessary by a pair of operational amplifiers prior to being applied to a video mix amplifier in the form of a pair of multipliers where the signals are used to attenuate the two different video signals prior to combination of the signals.

BRIEF DESCRIPTION OF THE DRAWINGS

The foregoing and other objects, features and advantages of the invention will be apparent from the following more particular description of a preferred embodiment of the invention as illustrated in the accompanying drawings, in which.

DETAILED DESCRIPTION

Figure 1:
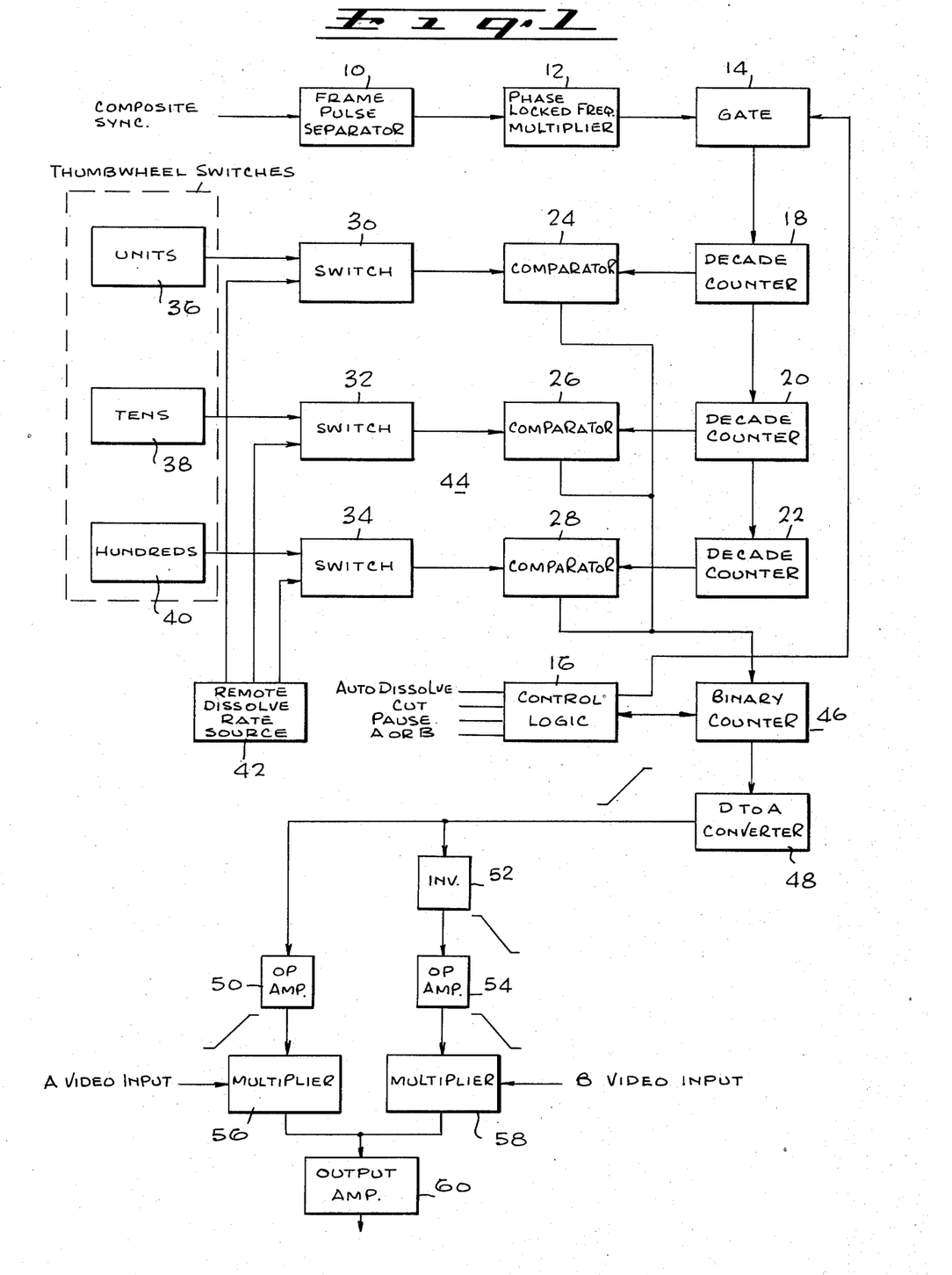
FIG. 1 is a block diagram of a digital dissolver in accordance with the invention.

A preferred arrangement of a digital dissolver in accordance with the invention is illustrated in FIG. 1. A conventional composite sync signal as provided by a master sync generator or other appropriate source is provided to a frame pulse separator 10. As described hereafter in connection with FIG. 2 the frame pulse separator 10 responds to the composite sync signal to generate the frame pulses by separating and comparing the vertical and horizontal information. The separated frame pulses comprising a frame signal are applied to a phase locked frequency multipler 12 which generates a frame related signal in phase locked relation with the frame signal and having a frequency which is a selected multiple of the frequency of the frame signal. The frequency of the phase related signal provided by the phase locked frequency multiplier 12 is made high enough to prevent the incremental steps of the dissolve from being visually discernible, particularly during a relatively slow dissolve.

The frame related signal from the phase locked frequency multiplier 12 is applied via a gate 14 under the control of control logic 16 to a plurality of decade counters 18, 20, and 22. The outputs of the decade counters 18, 20, and 22 are respectively coupled to a plurality of comparators 24, 26 and 28 for comparison with signals at the outputs of a plurality of switches 30, 32 and 34 respectively. The switches 30, 32 and 34 have a first input fed respectively by thumbwheel switches 36, 38 and 40 and a second input fed by a remote dissolve rate source 42. The remote dissolve rate source 42 may adopt the form of thumbwheel switches, such as the switches 36, 38, and 40, or any other form of digital signal defining a desired rate of dissolve. The decade counters 18, 20 and 22, the comparators 24, 26 and 28, the switches 30, 32 and 34 and the switches 36, 38 and 40 comprise a programmable divider 44 which acts to divide the frequency of the frame related signal from the phase locked frequency multiplier 12 by an amount determined by either the thumbwheel switches 36, 38 and 40 or signals from the remote dissolve rate source 42. The thumbwheel switches 36, 38 and 40 comprise a local source of digital signals defining the desired rate of dissolve. The switches 30, 32 and 34 select either the outputs of the switches 36, 38 and 40 or the signals from the remote source 42. As shown in FIG. 1 the dissolve rate signal comprises a three digit number indicating the number of frames to be used for the dissolve. The comparators 24, 26 and 28 compare the number of cycles of the frame related signal from the phase locked frequency multiplier 12 counted by the decade counters 18, 20 and 22 with the digital signal from the thumbwheel switches 36, 38 and 40 or from the remote source 42. Each time the comparators determine the two numbers to be equal, an output pulse is provided to a binary counter 46 and the decade counters 18, 20 and 22 are reset.

As described in connection with FIG. 4 the binary counter 46 counts between zero and a selected number in response to each pulse provided by the comparators 24, 26 and 28 and in a direction determined by the control logic 16. An associated digital to analog converter 48 converts the number in the binary counter 46 into an equivalent signal. This signal which comprises the dissolve signal is of stepped, generally ramp-like waveform as shown at the output of the digital to analog converter 48 in FIG. 1. The dissolve signal is applied to an operational amplifier 50. The complement of the dissolve as provided by an inverter 52 is provided to an operational amplifier 54. The operational amplifiers 50 and 54 provide gain adjustment and offset as required by the video mix amplifier. In the present example the video mix amplifier includes a pair of multipliers 56 and 58 and an output amplifier 60. The mulitplier 56 multiplies a first or A video signal by the dissolve signal as adjusted by the operational amplifier 50 so as to attenuate the A video signal accordingly. Similarly the multiplier 58 multiplies the second or B video signal by the complementary dissolve signal as adjusted by the operational amplifier 54 to attenuate the B video signal accordingly. The A and B signals as attenuated in the multipliers 56 and 58 respectively are combined with the output amplifier 60 to provide a single, combined, amplified video signal at the output thereof. The A and B video signals may be derived from any video signal source, e.g. from video tape systems or the like.

As described in connection with FIG. 4 the control logic 16 controls each dissolve operation by controlling the gate 14 and the binary counter 46. The control logic 16 responds to an external AUTO DISSOLVE command by opening the gate 14 to apply the frame related signal from the phase locked frequency multiplier 12 to the decade counters 18, 20 and 22 and thereby begin a dissolve. A further AUTO DISSOLVE command causes the control logic 16 to close the gate 14, thereby holding the dissolve signal at a particular value and terminating the dissolve. A still further AUTO DISSOLVE command again opens the gate 14 to resume the dissolve. The dissolve continues in the same direction unless an "A" or "B" command is received in which event the direction of the dissolve is reversed. When a PAUSE command is received, the control logic 16 responds by monitoring the count within the binary counter 46 and opening the gate 14 to stop the dissolve when the value in the binary counter 46 indicates that the dissolve is half completed. An AUTO DISSOLVE command again opens the gate 14 to resume and eventually complete the dissolve. At the end of each dissolve the count within the binary counter 46 causes the control logic 16 to close the gate 14.

Figure 2:
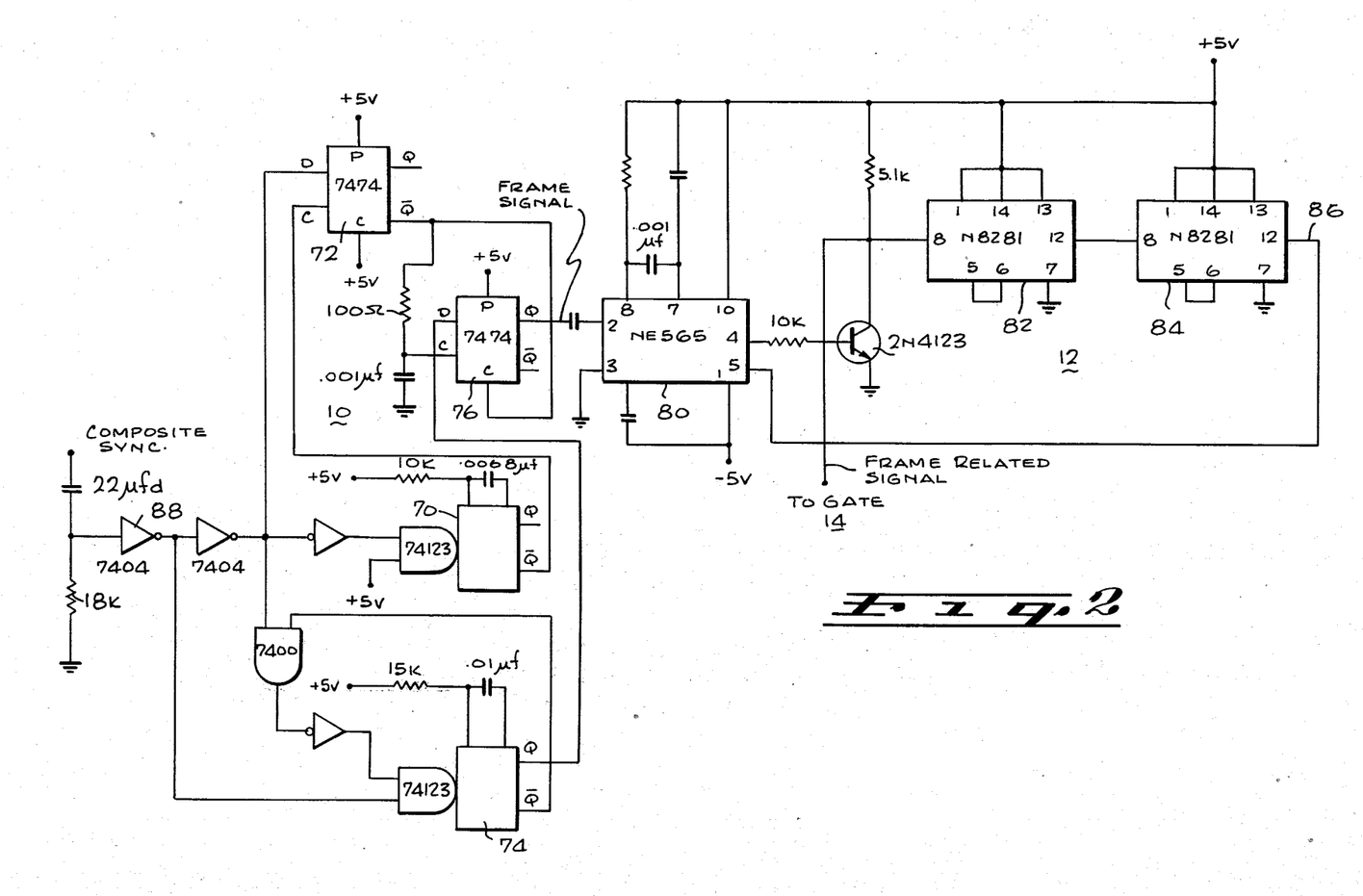
FIG. 2 is a schematic diagram of a portion of the arrangement of FIG. 1.

FIG. 2 provides an example of a specific circuit comprising the frame pulse separator 10 and the phase locked frequency multiplier 12. As seen in FIG. 2 the frame pulse separator 10 includes a clock pulse multivibrator 70, a vertical separation multivibrator 72, a horizontal separation multivibrator 74 and a frame separation multivibrator 76. The clock pulse multivibrator 70 responds to each transition of given sense of the composite sync signal to generate a pulse of selected duration. The pulses of selected duration comprise a clock pulse signal which is applied to the vertical separation multivibrator 72 to control gating of the composite sync signal. The resulting signal at the $\overline{Q}$ output of the vertical separation multivibrator 72 comprises separated vertical information. The horizontal separation multivibrator 74 responds to the composite sync signal by generating pulses of selected duration in response to certain transitions of given sense within the composite sync signal. The resulting signal at the $\overline{Q}$ and Q outputs of the horizontal separation multivibrator 74 comprises separated horizontal information. The Q output is introduced into the multivibrator 72 providing horizontal information thereto, whereas the $\overline{Q}$ output vibrator 74 to inhibit triggering thereof. The frame separation multivibrator 76 acts as a comparator by selectively gating the vertical information signal under the control of and thereby depending on the value of the horizontal informaton signal. The resulting signal at the $\overline{Q}$ output of the multivibrator 76 is the frame signal comprising the separated frame pulses.

Figure 3:
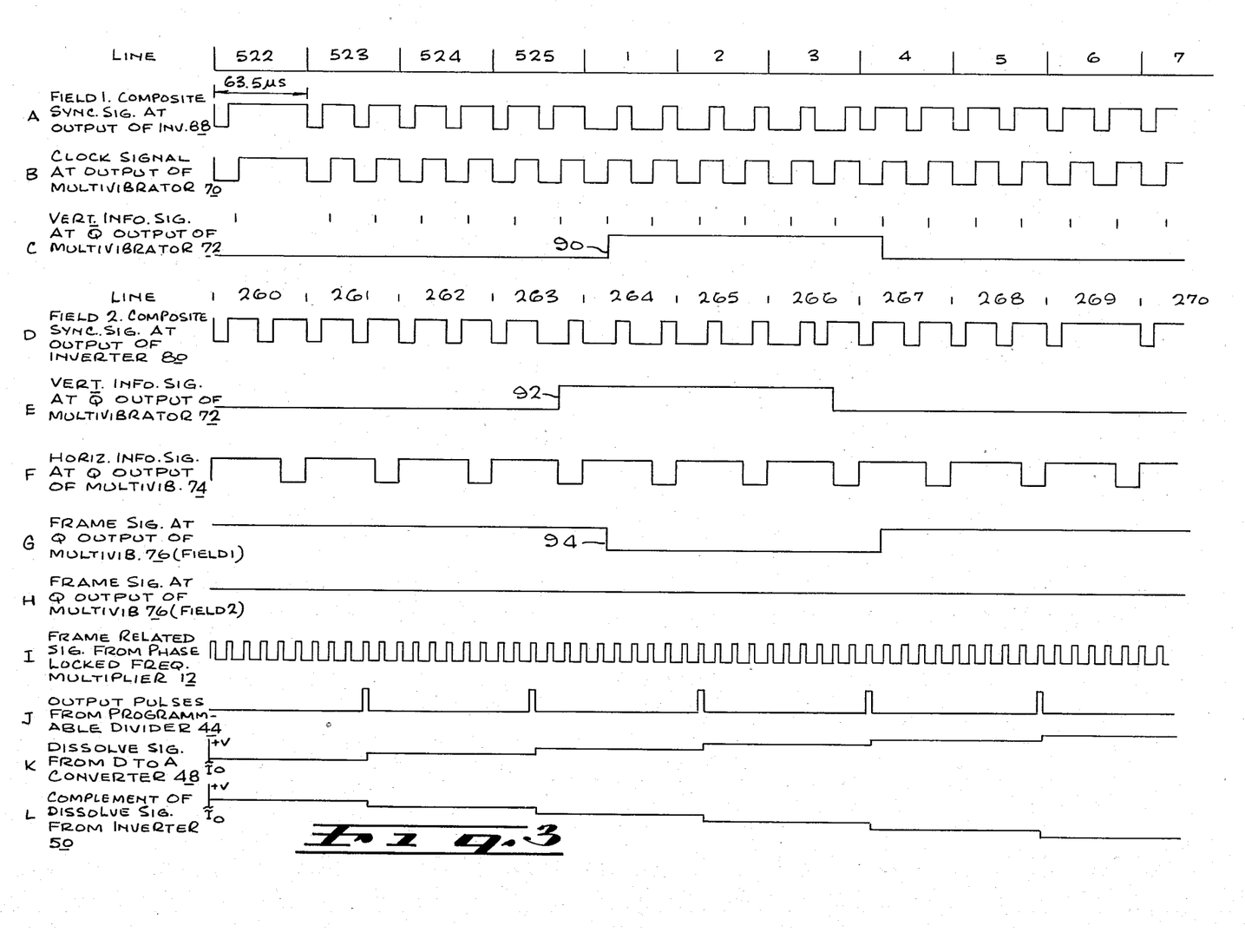
FIGS. 3A through 3L are waveforms useful in explaining the operation of the arrangement of FIG. 1.

The frame pulses from the frame pulse separator 10 are passed to the phase locked frequency multiplier 12 where they are applied to an integrated circuit 80 connected to function as both an oscillator and a phase comparator. The circuit 80 multiplies the frequency of the frame pulses by a selected number to produce the frame related signal at its output. The frame related signal is applied to the gate 14 as previously described. The frame related signal is also applied to a pair of integrated circuits 82 and 84 coupled to operate as frequency dividers. The circuits 82 and 84 divide the frequency of the frame related signal by a number equal to the number used to multiply the frequency of the frame pulses within the integrated circuit 80 so that the frame related signal has a frequency which is a selected multiple (depending on the rate of frequency division in the dividers) of the frequency of occurrence of the frame pulses. Consequently the signal at the output 86 of the integrated circuit 84 has the same frequency as the frame signal comprised of the frame pulses. For example, the multivibrator 76 may produce 30 frames per second as shown in line C of FIG. 3. The circuit 80 may operate at 356 times the 30 frames per pulse or at 7680 pulses per second (for black and white systems). Frequency divider 82 may divide these 7680 pulses per second by 16 and the frequency divider 84 may divide these pulses from the divider 82 by 16 so that the output of the divider 82 by 16 so that the output of the divider is 1/256 of the input. In this way, the output signal 86 will have the same frequency as the frame signal comprised of the frame pulses. This output signal is applied to the integrated circuit 80 which compares its phase with the phase of the frame pulses. Any differences are used to adjust the frequency of the oscillator within the circuit 80 so as to bring the signal at the output 86 and thereby the frame related signal into phase locked relation with the frame pulses.

The operation of the arrangement of FIG. 1 may be better understood by referring to the waveforms of FIGS. 3A through 3L. FIG. 3A depicts the first field (field 1) of the composite sync signal as it appears at the output of an inverter 88 within the frame pulse separator 10. The second field (field 2) of the composite sync signal as it appears at the output of the inverter 88 is shown in FIG. 3D. The composite sync signal is a standard television signal comprised of a succession of frames with each frame being comprised of 525 lines. The frames occur at a rate of 30 Hz for the black and white television of the present example. Accordingly each line is 63.5 microseconds in duration. The waveform of FIG. 3A depicts the last four lines (522–525) of a frame and the first 7 lines (1–7) of the following frame. The signal of FIG. 3D depicts 11 lines (260–270) of an intermediate portion of a frame.

In the present example the clock pulse multivibrator 70 responds to each negative-going transition of the signal of FIG. 3A to generate a pulse of 20 microseconds duration. The pulses at the output of the multivibrator 70 comprise the clock signal applied to the vertical separation multivibrator 72. When the signal of FIG. 3A is gated by the vertical separation multivibrator 72 under control of the clock signal of FIG. 3B, the resulting vertical information signal is shown in FIG. 3C. It will be noted that a pulse 90 occurs within this signal. When the field 2 composite sync signal shown in FIG. 3D is gated by the vertical separation multivibrator 72 under the control of the clock signal of FIG. 3B, the resulting vertical information signal as shown in FIG. 3E includes a pulse 92.

The horizontal separation multivibrator 74 generates a pulse of 45 microseconds duration in response to the negative-going transition at the beginning of each line of the composite sync signal of FIGS. 3A and 3D. The resulting horizontal information signal at the output of the multivibrator 74 is shown in FIG. 3F.

The frame separation multivibrator 76 compares the vertical information signal shown in FIGS. 3C and 3E with the horizontal information signal shown in FIG. 3F by gating the vertical information signal under the control of the horizontal information signal. The resulting frame signal at the output of the frame separation multivibrator 76 is shown in FIGS. 3G and 3H. As shown in FIG. 3G the presence of a pulse in the horizontal information signal of FIG. 3F at the beginning of the pulse 90 in the field 1 vertical information signal of FIG. 3C provides the field 1 portion of the frame signal with a pulse 94 as shown in FIG. 3G. However the pulse 92 within the field 2 portion of the vertical information signal is not gated by the horizontal information signal which is low at the commencement of the pulse 92. The resulting frame signal is shown in FIG. 3H.

The pulse 94 within the signal of FIG. 3G comprises the frame pulse identifying the beginning of a new frame. Each time a new frame is begun, another frame pulse like the pulse 94 is generated. The frame pulses comprising the frame signal are advantageously used in accordance with the invention to synchronize the dissolve with the frames. Consequently each dissolve is begun at the beginning of a frame and is terminated at the end of a frame.

Since the ramp-like dissolve signals are stepped between their opposite upper and lower limits using the binary counter 46 and the digital to analog converter 48, it is necessary to choose stepping increments of appropriately small size so that the dissolve appears smooth at the slowest dissolve rate. In the present example the dissolve rate is variable between 1 frame and 999 frames. It has been found that for the slowest dissolve rate of 999 frames, the dissolve appears smooth and continuous if incremented in the binary multiple of 256 steps. When the binary multiple of 128 steps is used some smoothness and continuity are load. On the other hand the binary multiple of 512 is unnecessary in the present example, since the desired results are achieved with the next lower multiple of 256. Of course the multiple actually used can vary depending on various system parameters including the range of dissolve rates.

In the present example a complete dissolve is completed in 256 incremental steps by providing the frame related signal produced by the phase locked frequency multiplier 12 with a frequency 256 times the frequency of the frame signal from the frame pulse separator 10. Since the frame signal in the present example has a frequency of 30 Hz, the frequency of the frame related signal is 30 × 256 or 7680 Hz. In color systems where the frame pulse rate is slightly less than 30 Hz, a frame related signal having a frequency of 7672 Hz is used. In a PAL television system a frequency of 6400 Hz is used for the frame related signal. In a 655/24 frame system a frame related signal frequency of 6144 Hz is used.

The frequency of 7680 Hz is divided by the programmable divider 44 depending on the dissolve rate number. For example if the dissolve is to be carried out in one frame, the binary number 1 provided to the comparator 24 by the switch 30 causes a pulse to be provided to the binary counter 46 in response to each cycle of the frame related signal. If the dissolve rate is chosen to be 999 frames, the binary number 999 provided to the comparators 24, 26 and 28 by the switches 30, 32 and 34 results in the production of a pulse to the binary counter 46 in response to each 999 cycles of the frame related signal.

The binary counter 46 counts between 0 and 256 with the direction of the count being determined by the control logic 16. With a count of 0 in the binary counter 46 the dissolve signal at the output of the digital to analog converter 48 is at its lowest value. Accordingly the multiplication signal at the output of the operational amplifier 50 is at its lowest value, and conversely the multiplication signal at the output of the operational amplifier 54 is at its highest value. This has the effect of multiplying the A video signal by 0 and the B video signal by 1 or unity. Consequently the signal at the output amplifier 60 is comprised entirely of the B video signal. If the control logic 16 opens the gate 14 in response to an external command to initiate a dissolve from the B video signal to the A video signal, the binary counter 46 counts up from 0 to 256 at a rate determined by the dissolve rate number at the output of the switches 30, 32 and 34. As the number in the binary counter 46 increases, the dissolve signal at the output of the digital to analog converter 48 is stepped upwardly until it eventually reaches its maximum value. When the dissolve signal has reached its maximum value the A video signal is effectively multiplied by unity and the B video signal is multiplied by 0, causing the signal at the output amplifier 60 to be comprised entirely of the A video signal. If external commands now dictate a dissolve from the A video signal to the B video signal, the gate 14 is again opened to apply the frame related signal to the programmable divider 44 to provide pulses to the binary counter 46. This time, however, the binary counter 46 begins at 256 and counts down until eventually 0 is reached. At the same time the dissolve signal at the output of the digital to analog converter 48 is stepped downwardly from its maximum value to its minimum value. When the count within the binary counter 46 reaches 0, the dissolve signal is at its minimum value causing the A video signal to be multiplied by 0 and the B video signal to be multiplied by unity. As described hereafter the system can be stopped part way through the dissolve with the binary counter 46 assuming some value between 0 and 256 and the dissolve signal at the output of the digital to analog converter 48 thereby assuming a value somewhere between the maximum and minimum values. When this condition occurs both the A video signal and the B video signal are present at the output amplifier 60 in a proportion determined by the value of the dissolve signal.

FIG. 3I depicts the frame related signal from the phase locked frequency multiplier 12. FIG. 3J depicts the output pulses from the programmable divider 44 when the signal to the switches 30, 32 and 34 indicates that the dissolve is to take place in 10 frames. This being the case the programmable divider 44 provides a pulse to the binary counter 46 in response to each 10 cycles of the frame related signal. In the present example the count in the binary counter 46 increases by one in response to each pulse from the divider 44. This results in an incremental increase in the dissolve signal at the output of the digital to analog converter 48 as shown in FIG. 3K. Each incremental increase in the dissolve signal results in a corresponding decrease in the complement thereof at the output of the inverter 50 as shown in FIG. 3L. The waveforms of FIGS. 3I, 3J, 3K and 3L encompass 5 of the 356 pulses from the divider 44 occurring during a dissolve from one video signal to the other.

Figure 4:
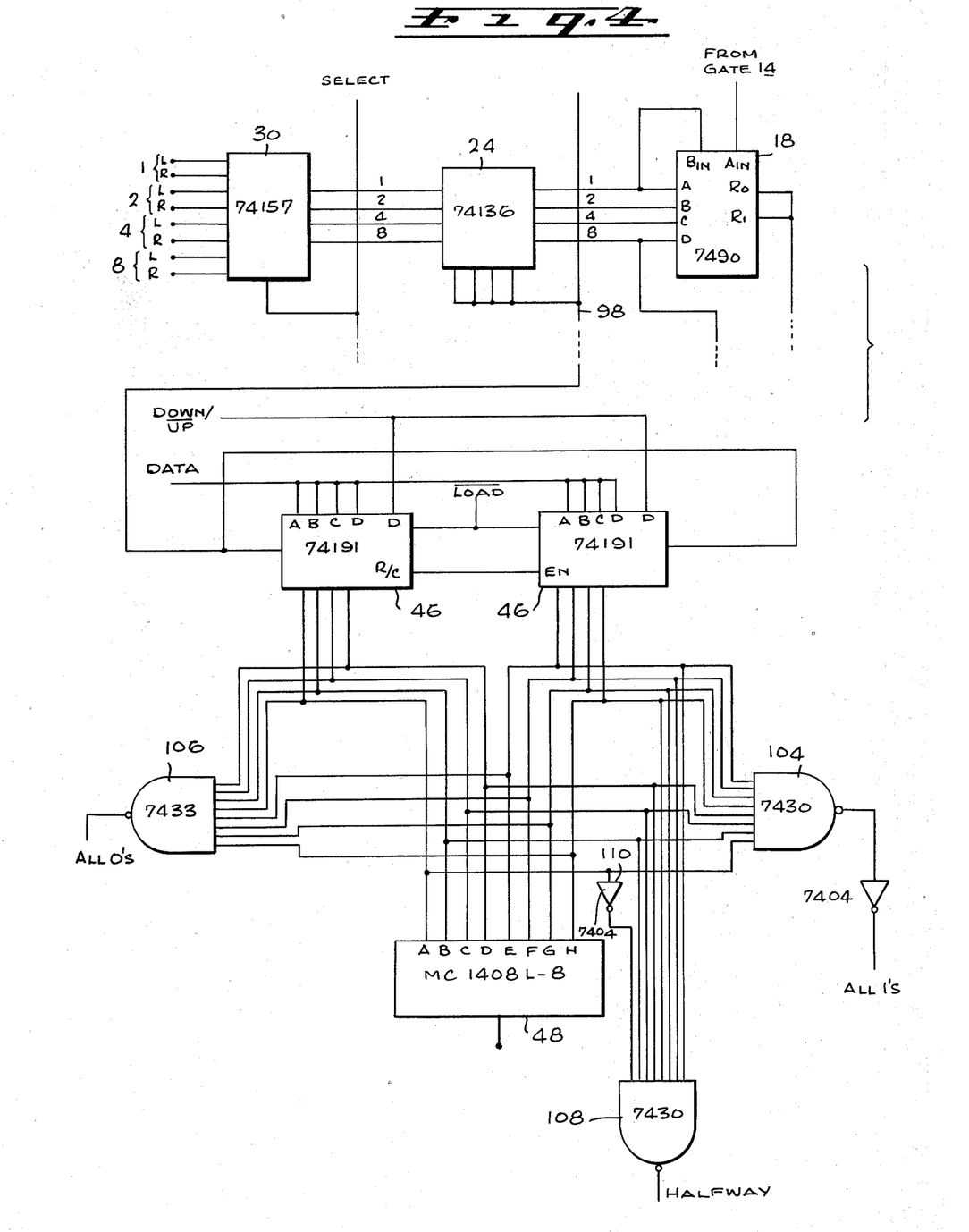
FIG. 4 is a schematic diagram of a portion of the arrangement of FIG. 1.

An example of circuitry which can be used in the programmable divider 44, the binary counter 46 and the digital to analog converter 48 is illustrated in FIG. 4. In the example of FIG. 4 the switch 30 comprises an integrated circuit having 8 different inputs. Four of the inputs are from the units thumbwheel switch 36 and the other four inputs are from the remote dissolve rate source 42. Each local-remote input pair comprises one of four different inputs which present the dissolve rate number in binary coded decimal (BCD) form. The integrated circuit comprising the switch 30 and similar circuits comprising the switches 32 and 34 function as 4-pole double throw switches by responding to an external select signal to apply the four inputs from either the associated thumbwheel switch or the remote dissolve rate source 42 to the associated comparator. The comparator 24 comprises an integrated circuit coupled to operate as an exclusive OR circuit. The four inputs from the switch 30 are compared with the four outputs of the decade counter 18. When the number represented in binary coded decimal form from the switch 30 equals the number in binary decimal coded form from the counter 18, the comparator 24 provides an output signal via a lead 98. When all three of the comparators 24, 26 and 28 provide output signals, a pulse is provided to the binary counter 46 and the decade counters 18, 20 and 22 are reset. The comparators 26 and 28 can comprise the same circuit shown as the comparator 24 shown in FIG. 4. Also the decade counters 20 and 22 can comprise the same circuit as shown for the decade counter 18 in FIG. 4.

As shown in FIG. 4 the binary counter 46 comprises an 8 bit binary counter coupled to count the output signals from the comparators of the divider 44 provided via the lead 98. The 8 bits of the counter 46 enable the counter to count between 0 and 256. The 8 outputs of the counter 46 are coupled to the digital to analog converter 48, to an integrated circuit 104 and to an integrated circuit 106. The 8 outputs are also coupled to an integrated circuit 108, seven of the outputs being coupled to the circuit 108 directly and one of the outputs being coupled to the circuit 108 through the inverter 110. When the counter 46 has counted to the maximum value of 256, all 8 outputs of the counter are "one" and the integrated circuit 104 responds by providing an ALL 1'S signal. Conversely, when the counter 46 is at 0, all 8 outputs of the counter are "zero" and the integrated circuit 106 responds by providing an ALL 0's signal. When the counter 46 reaches the halfway point corresponding to a count of 128, the outputs of the counter comprise 7 "ones" and a "zero". The "zero" is inverted by the inverter 110 into a "one". The integrated circuit 108 responds to the 8 "ones" by providing a HALF WAY signal. As described hereafter, this signal is used by the control logic 16 in response to an external PAUSE command to stop the dissolve when it is half completed.

In addition to being responsive to output signals from the divider 44, the binary counter 46 is responsive to DOWN/UP, DATA and LOAD signals from the control logic 16. The DOWN/UP signal determines whether the counter 46 counts up or down. The DATA and LOAD signals are used when a CUT command is received indicating that the system is to dissolve immediately to the A video signal or the B video signal. A DATA signal comprising all "ones" or all "zeros" is loaded directly into the binary counter 46 under the control of the LOAD signal, causing the dissolve signal to immediately assume its maximum or minimum value.

Figure 5:
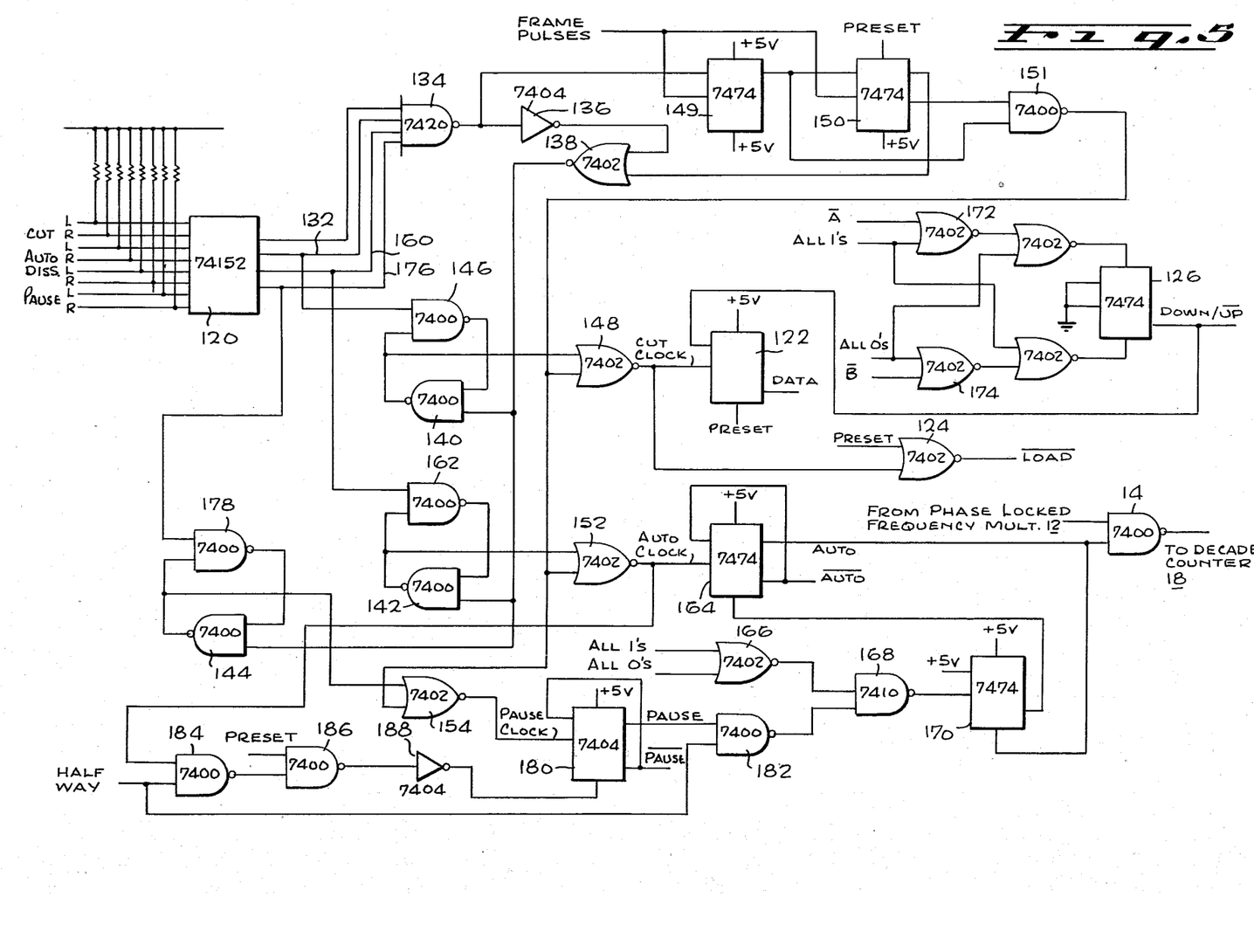
FIG. 5 is a schematic diagram of a portion of the arrangement of FIG. 1.

A preferred arrangement of a circuit comprising the control logic 16 and the gate 14 is schematically illustrated in FIG. 5. External AUTO DISSOLVE, PAUSE and CUT commands are received at the different paired inputs of an integrated circuit switch 120 which selects between the local and remote inputs of each pair. The commands can be manually generated such as by panel mounted switches or they can be provided by other sources such as a video tape reader. When the dissolver is first turned on, a resulting PRESET signal sets a flip flop 122. The resulting DATA signal at the output of the flip flop 122 provides a "one" to each of the 8 different inputs of the binary counter 46. At the same time application of the PRESET signal to a circuit 124 generates a LOAD signal to load the eight "ones" into the counter 46. This insures that the dissolver will begin at the A video signal. The resulting ALL 1's signal from the binary counter 46 causes a flip flop 126 to provide a signal to the counter 46 indicating that the counter 46 is to count down.

If a CUT command is now received by the integrated circuit siwtch 120, the resulting signal on a lead 132 is passed via circuits 134 and 16 to provide an input to a circuit 138 matching the other input to the circuit 138. The resulting high signal at the output of the circuit 138 is applied to one of the inputs of a circuit 140, a circuit 142 and a circuit 144. At the same time the signal on the lead 132 is applied via a circuit 146 to provide a high signal to the other input of the circuit 140. This produces a low signal at the output of the circuit 140 which is applied to a corresponding input of a circuit 148.

Prior to the arrival of a frame pulse at a pair of flip flips 149 and 150 a circuit 151 provides a high signal to the other input of the circuit 148 as well as to an input of a circuit 152 and an input of a circuit 154. Upon the occurrence of a frame pulse the output of the circuit 150 goes low so as to effectively gate the signal from the output of the circuit 140 through the circuit 148 to the flip flop 122 and the circuit 124. This signal clocks the flip flop 122, changing the direction of count from up to down or vice versa. If the dissolver is at the A video signal so that all "ones" are present at the output of the binary counter 46, the flip flop 126 is not affected. This condition plus the absence of all "zeros" sets the flip flop 126, providing a high signal to the flip flop 122. This condition combined with the output signal from the circuit 148 provides a low DATA signal to the binary counter 46. At the same time the signal from the output of the circuit 148 is applied to the circuit 124 to generate a LOAD signal, causing eight "zeros" to be loaded into the binary counter 46. The presence of all "zeros" in the counter 46 changes the DOWN/UP signal via the flip flop 126.

It will therefore be seen that whenever a CUT command is received eight "zeros" or eight "ones" are immediately loaded into the binary counter 46 depending upon the direction of dissolve. A CUT command can be received prior to dissolve or when the dissolver is partway through the dissolve. In either event the dissolver dissolves substantially immediately to the opposite video signal.

When an AUTO DISSOLVE command is received, the integrated circuit switch 120 provides a signal on a lead 160. This signal is applied to the circuit 134 and to a circuit 162 coupled to the circuit 142. The resulting signal at the output of the circuit 162 combines with the signal from the circuit 138 at the inputs of the circuit 142 to provide a low signal to one of the inputs of the circuit 152. When the next frame pulse arrives at the flip flops 149 and 150 causing the output of the circuit 151 to become low, the circuit 152 clocks a flip flop 164 to provide an AUTO signal to the gate 14. This opens the gate 14, applying the frame related signal from the phase locked frequency multiplier 12 to the decade counter 18. At the end of the dissolve the resulting ALL 1'S or ALL 0'S signal from the binary counter 46 is applied via a circuit 166 and a circuit 168 to a flip flop 170. The resulting output of the flip flop 170 resets the flip flop 164 to terminate the AUTO signal and thereby close the gate 14.

A dissolve which is begun by an AUTO DISSOLVE command can be halted before completion of the dissolve by receipt of a subsequent AUTO DISSOLVE command. Such subsequent command causes resetting of the flip flop 164 to terminate the AUTO signal and thereby close the gate 14. If a still further AUTO DISSOLVE command is then received, the flip flop 164 is again set to provide the AUTO signal and thereby open the gate 14.

When the dissolve is temporarily halted at a point partway through the dissolve, the direction of dissolve can be reversed in response to an external A or B signal applied respectively to a circuit 172 or a circuit 174 associated with the flip flop 126. This changes the state of the flip flop 126 and thus the DOWN/UP signal. When the dissolve is resumed by setting the flip flop 164 to open the gate 14, the binary counter 46 begins counting in the new direction as determined by the flip flop 126.

If it is desired to half a dissolve at the half way point between the A video signal and the B video signal, a PAUSE command is provided via the switch 120 to produce a signal on a lead 176. This signal is applied to a circuit 178 as well as to the circuit 134. The resulting signal at the output of the circuit 178 combines with the signal at the output of the circuit 138 to provide a low signal at one of the inputs of the circuit 154. When the next frame pulse is received by the flip flops 149 and 150 the resulting change in the output signal from the circuit 151 results in the clocking of a flip flop 180 to provide a PAUSE signal to enable one of the inputs of a circuit 182. The other input of the circuit 182 is enabled by the HALF WAY signal from the circuit 108 at the output of the binary counter 46. When this occurs the resulting signal to the circuit 168 changes the state of the flip flop 170 and thereby the state of the flip flop 164. The resulting termination of the AUTO signal closes the gate 14 to halt the dissolve at the half way point. The dissolver remains at the half way point until a subsequent AUTO DISSOLVE command is received so as to again set the flip flop 164 and thereby open the gate 14. At the same time the flip flop 180 is cleared by the signal at the output of the circuit 152 which combines with the HALF WAY signal at a circuit 184 to provide a clear signal to the flip flop 180 via a circuit 186 and an inverter 188.

As previously noted the operational amplifiers 50 and 54 are present to provide compatibility with different video mix amplifier arrangements. Each operational amplifier preferably has an offset control and a gain control so as to be able to adjust the dissolve signal or its complement appropriately. An example of a circuit which can be used as the operational amplifier 50 or 54 is the integral circuit designated MC 1458. Each of the multipliers 56 and 58 can be comprised of an integrated circuit of the designation MC 1495L.

While the invention has been particularly shown and described with reference to a preferred embodiment thereof, it will be understood by those skilled in the art that various changes in form and details may be made therein without departing from the spirit and scope of the invention.

What is claimed is:

1. A dissolver for generating a dissolve signal in synchronism with a composite sync signal comprising the combination of:
    means responsive to the composite sync signal for generating a frame signal having a plurality of cycles corresponding to the different frames of the composite sync signal;
    means responsive to the frame signal for generating a frame related signal in phase locked relation with the frame signal, the frame related signal being comprised of a succession of cycles defining a frequency which is a multiple of the frequency of the frame signal;
    means responsive to the frame related signal for generating a separate pulse each time a predetermined number of cycles of the frame related signal occurs; and
    means responsive to the separate pulses for generating a dissolve signal having an amplitude which is changed a selected amount in response to each separate pulse.

2. The invention defined in claim 1, further comprising means for providing two different video signals, first multiple means receiving one of the two video signals and the dissolve signal for varying one of the two different video signals in accordance with the dissolve signal, means for providing the complement of the dissolve signal, second multiple means receiving the other of the two video signals and the complement of the dissolve signal for varying the other one of the two different video signals in accordance with the complement of the dissolve signal, and means operatively connected to the first and second multiple means for combining the two different video signals as varied by the dissolve signal and the complement of the dissolve signal.

3. The invention defined in claim 1, further comprising external command means for providing a plurality of external commands, and means operatively connected to said external command means and being responsive to said external commands for controlling the application of the frame related signal to the means for generating a separate pulse.

4. The invention defined in claim 1, wherein said predetermined number of cycles is variable and means is provided for selecting the number of cycles in response to external commands representing a desired dissolve rate.

5. A dissolver for generating a dissolve signal in response to a sync signal, the sync signal including information identifying separate frames, comprising:
    sync signal generating means for providing a sync signal which includes information identifying separate frames;
    means responsive to the sync signal for separating the information identifying separate frames from the sync signal to provide indications of separate frames;
    means for providing a signal representing rate of dissolve; and
    dissolve signal generating means responsive to the indication of separate frames and to the signal representing rate of dissolve for generating a dissolve signal having a value which varies in voltage with voltage signals corresponding to the indications of separate frames and at a rate determined by the signal representing rate of dissolve.

6. The invention defined in claim 5, wherein the sync signal includes vertical and horizontal information and means for separating the information identifying separate frames includes first separation means responsive to the sync signal for separating the vertical information therefrom, second separation means responsive to the sync signal for separating the horizontal information therefrom, and means operatively connected to said first and second separation means receiving the vertical and horizontal information for comparing the vertical and horizontal information to provide the indications of separate frames.

7. The invention defined in claim 6, wherein the sync signal comprises a plurality of pulses, the means for separating the vertical information comprises means responsive to the sync signal for generating a pulse of first duration in response to each pulse of the sync signal to form a clock signal and means for gating the sync signal under control of the clock signal to provide a vertical information signal, the means for separating the horizontal information comprises means responsive to the sync signal for generating a pulse of second duration in response to selected pulses of the sysnc signal to provide a horizontal information signal, means associated with one of the means for generating pulses of first duration or pulses of second duration also generating said selected pulses of said sync signal, and the means for comparing comprises means for gating the vertical information signal under control of the horizontal information signal.

8. The invention defined in claim 5, further including means for providing two different video signals, first attenuation means for attenuating one of the two different video signals in accordance with the dissolve signal, means for inverting the dissolve signals, second attenuation means receiving the other of the two different video signals and the inverted dissolve signal for attenuating the other one of the two different video signals in accordance with the inverted dissolve signal, and means operatively connected to the first and second attenuation means for combining the attenuated video signals.

9. The invention defined in claim 5, further including external command means for providing a plurality of external commands, and means operatively connected to said external command means and being responsive to said external commands for controlling the generation of the dissolve signal.

10. The invention defined in claim 9, wherein the dissolve signal generating means for controlling the generation of the dissolve signal includes means forming a part thereof for starting the generation of the dissolve signal and means operatively associated with said last named means for determining the direction of variation of the dissolve signal.

11. The invention defined in claim 9, wherein the value of the dissolve signal is variable between two different levels and the means for controlling the generation of the dissolve signal includes means for stopping the generation of the dissolve signal at a selected value between the two different levels.

12. The invention defined in claim 5, wherein the means for generating a dissolve signal comprises means for generating a frame related signal having a frequency relating to the rate of occurrence of the indications of separate frames, means responsive to the frame related signal and to the signal representing rate of dissolve for dividing the frequency of the frame related signal by an amount determined by the signal representing rate of dissolve to provide a frequency divided frame related signal, and means responsive to the frequency divided frame related signal for generating the dissolve signal, and means operatively associated with said last named means for varying the value of the dissolve signal at a rate determined by the frequency of the frequency divided frame related signal.

13. The invention defined in claim 12, wherein the indications of separate frame signal, the frame related signal comprises a succession of pulses occurring at a frequency which is a multiple of the frequency of the frame signal, the means for dividing comprises means for generating an output pulse each time a selected number of pulses of the frame related signal are received, the output pulses comprising the frequency divided frame related signal, counter means coupled to provide a count of the output pulses comprising the frequency divided frame related signal, and the means for generating the dissolve signal comprises means for converting the count in the counter means into an analog signal.

14. A digital dissolver for generating a dissolve signal in synchronism with a composite sync signal containing frame pulses comprising:
a frame pulse separator responsive to the composite sync signal for separating the frame pulses from the composite sync signal;
a phase locked frequency multiplier responsive to the frame pulses for multiplying the frequency of occurence of the frame pulses to provide a frame related signal in phase locked relation with the frame pulses and having a frequency which is a selected multiple of the frequency of occurence of the frame pulses;
means for providing a digital number representing the number of frames of the composite sync signal required to carry out a dissolve;
a first counter means;
gating means operatively connected to said phase locked frequency multiplier and said first counter means for selectively coupling the phase locked frequency multiplier to the first counter means, the first counter means being operative to count cycles of the frame related signal;
comparator means operatively connected to said first counter means for providing an output signal each time the number of cycles of the frame related signal counted by the first counter means equals the digital number representing the number of frames of the composite sync signal required to carry out a dissolve;
second counter means operatively connected to said comparator means to count the output signals provided by the comparator means; and
a digital to analog converter operatively connected to said second counter means for providing a dissolve signal which is the analog equivalent of the number of output signals counted by the second counter means.

15. The invention defined in claim 14, wherein the means for providing a digital number representing the number of frames of the composite sync signal required to carry out a dissolve includes manually adjustable means for providing a first digital number, means remote from the dissolver for providing a second digital number, and switch means coupled to provide the first or second digital number as said digital number representing the number of frames of the composite sync signal required to carry out a dissolve.

16. The invention defined in claim 14, further including means for providing first and second video signals, a first operational amplifier coupled to selectively vary the dissolve signal, means coupled to receive the dissolve signal for inverting the dissolve signal, a second operational amplifier operatively connected to the means for inverting the dissolve signal to selectively vary the inverted dissolve signal, a first multiplier coupled to multiply the first video signal by the dissolve signal as selectively varied by the first operational amplifier to provide a first product signal, a second multiplier coupled to multiply the second video signal by the inverted dissolve signal as selectively varied by the second operational amplifier to provide a second product signal, and means for combining the first and second product signals.

17. The invention defined in claim 14, further including means providing an external command, means coupled to and responsive to the external command for causing the gating means to couple the phase locked frequency multiplier to the first counter means, means for determining the direction in which the second counter means counts in response to the output signals provided by the comparator means, and means for causing the gating means to uncouple the phase locked frequency multiplier from the first counter means.

18. The invention defined in claim 17, further including means responsive to an external command for uncoupling the phase locked frequency multiplier from the first counter means.

19. The invention defined in claim 17, wherein said second counter means provides a second predetermined count, said invention further including means responsive to said second predetermined count which is different from said first-mentioned predetermined count in the second counter means for causing the gating means to uncouple the phase locked frequency multiplier from the first counter means.

20. The invention defined in claim 17, further including means responsive to an external command for setting the second counter means to said predetermined.

21. The invention defined in claim 14, wherein the frame pulse separator first pulse generating means for generating pulses of fixed duration sync signal to form a first pulse signal, second pulse generating means for generating pulses of fixed duration in response to transitions of selected sense of the first pulse signal in the presence of a given value of the composite sync signal to form a second pulse signal, third pulse generating means for generating pulses of fixed duration in response to transitions of given sense of the composite sync signal to form a third pulse signal, and fourth pulse generating means for generating pulses of fixed duration in response to transitions of selected sense of the second pulse signal in the presence of a given value of the third pulse signal, the fourth pulse signal comprising the separated frame pulses.

22. The invention defined in claim 21, wherein the phase locked frequency multiplier comprises means responsive to the separated frame pulses for generating a frame related signal having a frequency which is a selected number of times greater than the frequency of the frame pulses, means for dividing the frame related signal by the selected number to provide a comparison signal having the same frequency as the frame pulses, and means for comparing the phase of the comparison signal with the phase of the frame pulses, the means for comparing being operative to vary the frequency of the frame related signal in response to differences between the phase of the comparison signal and the frame pulses.

23. A method for generating a dissolve signal in synchronism with a composite sync signal comprising the steps of:
generating a frame signal responsive to the composite sync signal so that the frame signal has a plurality of cycles corresponding to the different frames of the composite sync signal;
generating a frame related signal responsive to the frame signal and in phase locked relation with the frame signal, the frame related signal being comprised of a succession of cycles defining a frequency which is a multiple of the frequency of the frame signal;
generating a separate pulse in response to the frame related signal each time a predetermined number of cycles of the frame related signal occurs; and
generating a dissolve signal in response to the separate pulses so that the dissolve signal has an amplitude which is changed a selected amount in response to each separate pulse.

24. The method defined in claim 23, wherein the method further comprises providing two different video signals, varying one of the two different video signals in accordance with the dissolve signal, providing the complement of the dissolve signal, varying the other one of the two different video signals in accordance with the complement of the dissolve signal, and combining the two different video signal as varied by the dissolve signal and the complement of the dissolve signal.

25. The method defined in claim 23, further comprising providing a plurality of external commands, and controlling the application of the frame related signal to the generation of a separate pulse in response to the external command.

26. A method for generating a dissolve signal in response to a sync signal comprising:
providing a sync signal which includes information identifying separate frames;
separating the information identifying separate frames from the sync signal responsive to the sync signal to provide indications of separate frames;
providing a signal representing rate of dissolve; and
generating a dissolve signal in response to the indications of separate frames and to the signal representing rate of dissolve and which dissolve signal has a value in which varies in voltage with voltage signals corresponding to the indications of separate frames and at a rate determined by the signal representing rate of dissolve.

27. The method defined in claim 26, wherein the sync signal includes vertical and horizontal information and the method furthe comprises the step of separating the information identifying separaate frames including separate the vertical information from the sync signal, and comparing the vertical and horizontal information to provide the indications of separate frames.

28. A method for generating a dissolve in synchronism with a composite sync signal containing frame pulses comprising:
separating the frame pulses from the composite sync signal;
multiplying the frequency of occurrence of the frame pulses in a phase locked frequency multiplier responsive to the frame pulses;
providing a frame related signal in phase locked relation with the frame pulses and having a frequency which is a selected multiple of the frequency of occurrence of the frame pulses;
providing a digital number representing the number of frames of the composite sync signal required to carry out a dissolve;
selecting coupling the phase locked frequency multiplier to a first counter means and counting cycles of the frame related signal in the first counter means;
comparing the number of cycles of the frame related signal to the digital number representing the rate of dissolve;
providing an output signal each time the number of cycles of the frame related signal counted by the first counter means equals the digital number representing the number of frames of the composite sync signal required to carry out a dissolve;
counting the output signals provided by the comparator means in a second counter means; and
providing a dissolve signal which is the analog equivalent of the number of output signals counted by the second counter means.

29. The method defined in claim 28, further including providing first and second video signals, selectively varying the dissolve signal, inverting the dissolve signal, selectively varying the inverted dissolve signal, multiplying the first video signal by the dissolve signal as selectively varied to provide a first product signal, multiplying the second video signal by the inverted dissolve signal as selectively varied to provide a second product signal, and combining the first and second product signals.

* * * * *